United States Patent
Iwaki (10) Patent No.: US 7,437,198 B2
(45) Date of Patent: Oct. 14, 2008

(54) INFORMATION PROCESSING APPARATUS AND METHOD OF CONTROLLING THE SAME

(75) Inventor: Tsutomu Iwaki, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 3 days.

(21) Appl. No.: 11/522,994

(22) Filed: Sep. 19, 2006

(65) Prior Publication Data

US 2007/0079141 A1 Apr. 5, 2007

(30) Foreign Application Priority Data

Sep. 30, 2005 (JP) ............................. 2005-288885

(51) Int. Cl.
*G06F 9/00* (2006.01)
*G06F 9/24* (2006.01)
*G06F 15/177* (2006.01)
*G06F 7/04* (2006.01)
*G06F 17/30* (2006.01)
*G05B 15/00* (2006.01)
*G05B 11/01* (2006.01)

(52) U.S. Cl. ............................. 700/17; 700/83; 713/1; 713/2; 726/2; 726/4; 726/28; 726/29; 726/30

(58) Field of Classification Search ............... 713/1–2, 713/200–201; 726/2, 4, 28–30; 700/17, 700/83
See application file for complete search history.

(56) References Cited

U.S. PATENT DOCUMENTS

| | | | | |
|---|---|---|---|---|
| 5,715,174 A * | 2/1998 | Cotichini et al. | ............ | 709/229 |
| 5,732,268 A * | 3/1998 | Bizzarri | .................. | 713/2 |
| 5,748,084 A * | 5/1998 | Isikoff | ............... | 340/568.1 |
| 5,764,892 A * | 6/1998 | Cain et al. | ................. | 709/200 |
| 5,802,280 A * | 9/1998 | Cotichini et al. | ............ | 709/200 |
| 6,151,678 A * | 11/2000 | Davis | .................. | 726/35 |
| 6,189,099 B1 * | 2/2001 | Rallis et al. | ................. | 713/172 |
| 6,216,230 B1 * | 4/2001 | Rallis et al. | ................. | 713/185 |
| 6,244,758 B1 * | 6/2001 | Solymar et al. | ............. | 709/224 |
| 6,269,392 B1 * | 7/2001 | Cotichini et al. | ............ | 709/200 |
| 6,362,736 B1 * | 3/2002 | Gehlot | ............... | 340/568.1 |
| 6,507,914 B1 * | 1/2003 | Cain et al. | ..................... | 726/35 |
| 6,539,473 B1 * | 3/2003 | Hubacher et al. | .............. | 713/2 |
| 6,618,810 B1 * | 9/2003 | Dirie | ......................... | 726/27 |
| 6,654,890 B1 * | 11/2003 | Girard | ........................ | 726/35 |
| 6,725,379 B1 * | 4/2004 | Dailey | ........................ | 726/35 |
| 6,854,147 B1 * | 2/2005 | Ahlsten | ..................... | 14/69.5 |
| 6,925,562 B2 * | 8/2005 | Gulcu et al. | ................ | 713/172 |
| 6,950,946 B1 * | 9/2005 | Droz et al. | ..................... | 726/35 |
| 7,051,196 B2 * | 5/2006 | Angelo et al. | ................. | 713/1 |

(Continued)

FOREIGN PATENT DOCUMENTS

JP  2001-125661  5/2001

(Continued)

*Primary Examiner*—Ronald D Hartman, Jr.
(74) *Attorney, Agent, or Firm*—Finnegan, Henderson, Farabow, Garrett & Dunner, L.L.P.

(57) ABSTRACT

According to one embodiment, an information processing apparatus provided with a communication section, and capable of communicating with an external device, the information processing apparatus including a detection section configured to detect that the information processing apparatus is powered up, and a section configured to make the communication section available, wherein after being made available, the communication section transmits information regarding the information processing apparatus to the external device.

4 Claims, 6 Drawing Sheets

U.S. PATENT DOCUMENTS

| | | | |
|---|---|---|---|
| 7,266,849 B1* | 9/2007 | Gregory et al. | 726/34 |
| 2002/0016838 A1* | 2/2002 | Geluc et al. | 709/224 |
| 2003/0005316 A1* | 1/2003 | Girard | 713/193 |
| 2004/0103298 A1* | 5/2004 | Hafeman | 713/200 |
| 2005/0044404 A1* | 2/2005 | Bhansali et al. | 713/200 |
| 2005/0071670 A1* | 3/2005 | Hafeman | 713/200 |
| 2005/0073389 A1* | 4/2005 | Chandley | 340/5.31 |
| 2005/0149752 A1* | 7/2005 | Johnson et al. | 713/201 |
| 2005/0177492 A1* | 8/2005 | Camping | 705/38 |
| 2006/0253904 A1* | 11/2006 | Bhansali et al. | 726/13 |
| 2006/0272034 A1* | 11/2006 | Bhansali et al. | 726/34 |
| 2006/0276175 A1* | 12/2006 | Chandran | 455/411 |
| 2007/0018843 A1* | 1/2007 | Cullum | 340/825.49 |

FOREIGN PATENT DOCUMENTS

| | | |
|---|---|---|
| JP | 2003-234828 | 8/2003 |
| JP | 2003-345659 | 12/2003 |

* cited by examiner

Set manager password

Select security tracking ?
☐ Yes

Allow password change ?
☐ Yes

FIG. 4

Setting of security tracking
☐ E-mail
☐ FTP
☐ UDP

Trigger start timing

☐ Immediately

☐ After power is turned off    After ☐ days

☐ Switching between turning on and off of power    After ☐ occurrences

Transmission interval
Interval ☐ days

INFORMATION PROCESSING APPARATUS AND METHOD OF CONTROLLING THE SAME

CROSS-REFERENCE TO RELATED APPLICATIONS

This application is based upon and claims the benefit of priority from Japanese Patent Application No. 2005-288885, filed Sep. 30, 2005, the entire contents of which are incorporated herein by reference.

BACKGROUND

1. Field

One embodiment of the invention relates to an information processing apparatus such as a computer, which has a high security, and a method of controlling the information processing apparatus.

2. Description of the Related Art

In recent years, a large number of problems have occurred with respect to leakage of personal information. To be more specific, there are cases where a personal computer is stolen, and personal information is also stolen from the personal computer. In view of such circumstances, it is proposed (in Jpn. Pat. Appln. KOKAI Publication No. 2003-345659) that in the case where a personal computer is stolen, the user makes a phone call to a cellular phone attached to the personal computer through a communication device provided therein to check and monitor the position of a personal computer. However, this is disadvantageous, since it is necessary that the cellular phone is attached to the personal computer, and the user must make a phone call to the cellular phone in order to check and monitor the position of the personal computer.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus is provided with communication unit, and is capable of communicating with an external device, comprises detection unit for detecting that the information processing apparatus is powered up, and unit for making the communication unit available, and after being made available, the communication unit transmits information regarding the information processing apparatus to the external device.

An embodiment of the present invention will be explained with reference to the accompanying drawings.

Figure 1:
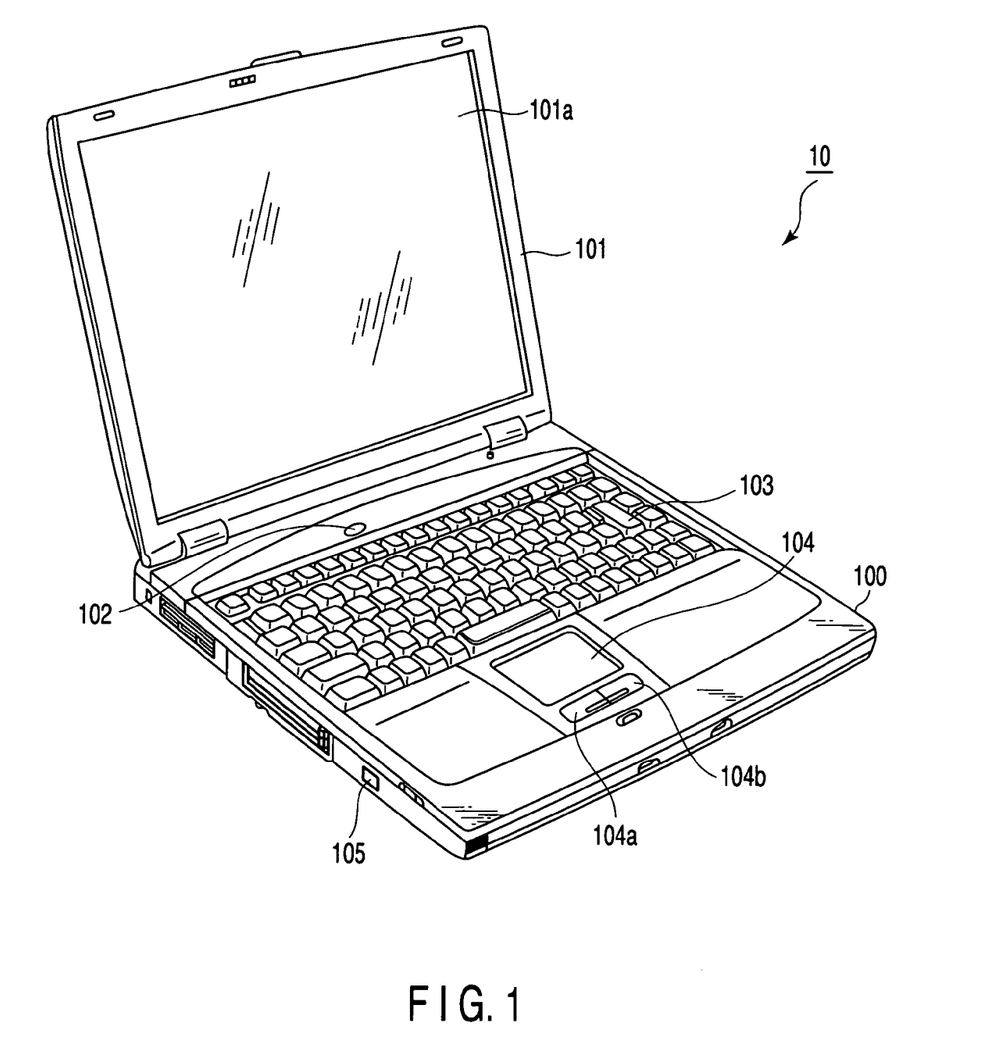
FIG. 1 is an external appearance of an information processing apparatus according to an embodiment of the present invention.

FIG. 1 shows the system configuration of an information processing apparatus according to the embodiment of the present invention. As the information processing apparatus, a notebook computer 10 is provided which can be driven by a battery.

As shown in FIG. 1, the computer 10 comprises a computer body 100 and a display unit 101. The display unit 101 incorporates a display device comprising a liquid crystal display (LCD) 101a.

The display unit 101 is rotatably attached to the computer 10. The computer body 100 of the computer 10 includes a thin box-shaped housing. On an upper surface thereof, a power button 102, a keyboard 103, a touch pad 104, and two buttons 104a and 104b, i.e., left and right buttons, are provided. The touch pad 104 and the buttons 104a and 104b are located on a palm rest of the computer body 100. At a side surface of the computer body 100, an optical drive 105 is provided.

Figure 2:
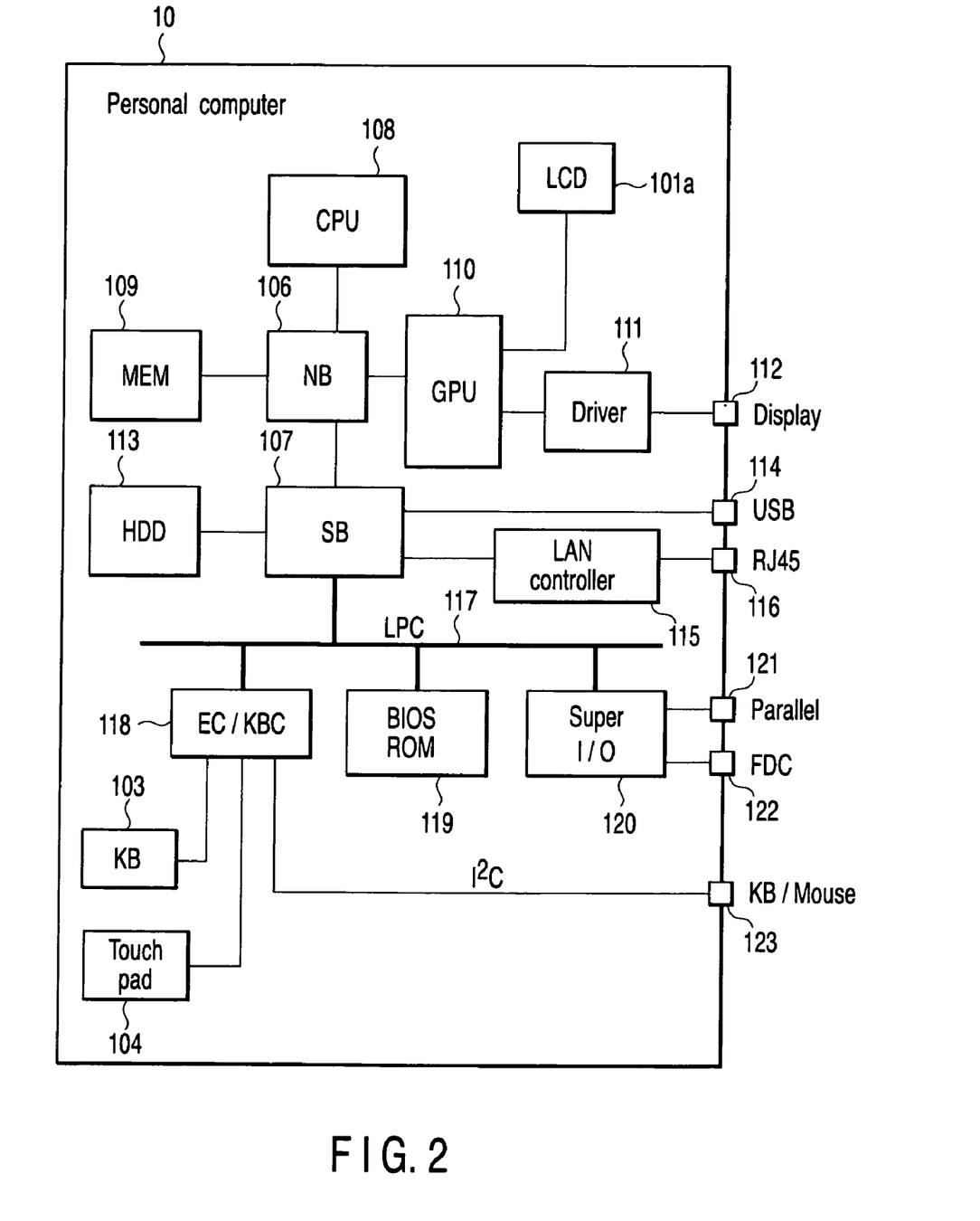
FIG. 2 is a block diagram of the structure of a personal computer which corresponds to the information processing apparatus according to the embodiment of the present invention.

FIG. 2 is a block diagram of the structure of the computer 10 according to the embodiment of the invention.

The computer 10 comprises a North Bridge (NB) 106 and a South Bridge (SB) 107. To the NB 106, a central processing unit (CPU) 108, a memory (MEM) 109 and graphic processing unit (GPU) 110 are connected. To the GPU 110, the LCD 101 and a display terminal 112 are connected. Between the GPU 110 and the display terminal 112, a driver 111 necessary for outputting of an external monitor is located.

To the SB 107, a hard disk drive (HDD) 113, a Universal Serial Bus (USB) terminal 114, e.g., a LAN terminal 116 which is an RJ 45, and a Low Pin Count (LPC) bus 117 are connected. Between the LAN terminal 116 and the SB 107, a LAN controller 115 is located.

Furthermore, a parallel terminal 121, a floppy disk controller (FDC) 122 and a BIOS-ROM 119 are connected to the LPC bus 117 through a super I/O 120, and a keyboard/mouse external connection 123, the keyboard 103, and the touch pad 104, etc. are also connected to the LPC bus 117 through an EC/KBC (controller) 118.

Next, a control method for the information processing apparatus according to the embodiment of the present invention will be explained with reference to FIGS. 3 to 7.

First, a method of setting a security tracking function will be explained.

Suppose the computer 10 has at least one of a local area network (LAN) function, a radio LAN function, a GPS function, a communication card function and a telephone function (i.e., a function of achieving connection of a fixed telephone through a cell phone or modem) as communication unit. The embodiment will be explained by referring to the case where the computer 10 has the LAN function.

First of all, a user carries out setting regarding a security tracking function. The security tracking function is a function of enabling the user of the computer 10 to grasp information regarding the computer 10, e.g., the present position thereof, by transmitting information regarding the computer 10, to an external device by using communication unit such as the LAN function.

Figure 4:
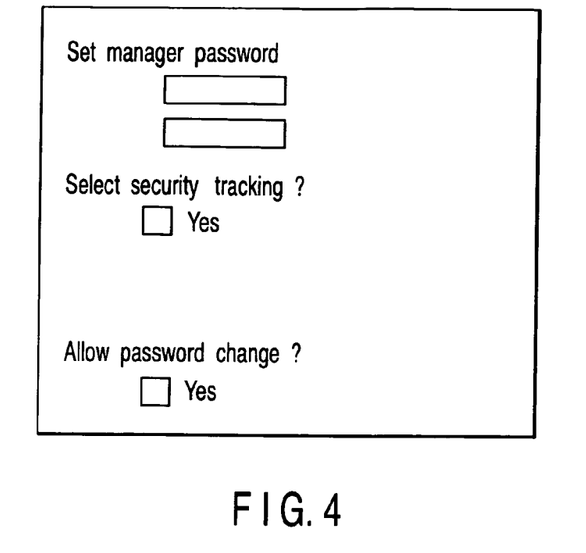
FIG. 4 is a diagrammatic view showing an image for use in setting information regarding a computer.

FIG. 4 is a diagrammatic view showing an example of a window for use in setting the security tracking function.

Figure 3:
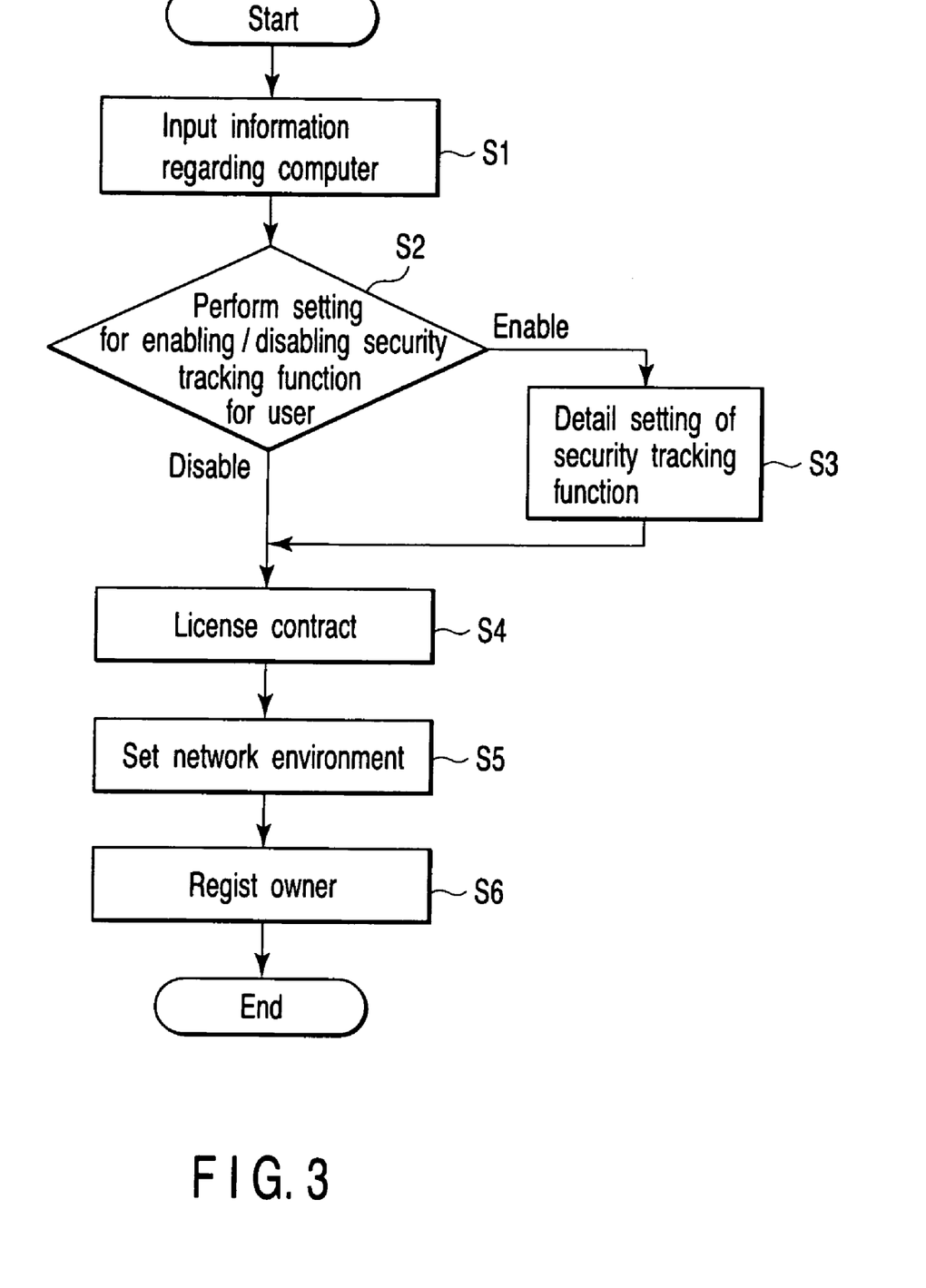
FIG. 3 is a flowchart of a method of setting a security tracking function, which is a control method to be applied to the information processing apparatus according to the embodiment of the present invention.

After causing the window for use in setting the security tracking function to be displayed on the LCD 101, the user carries out setting regarding "manager password", "whether or not to enable the security tracking function" and "whether or not to allow the password to be changed", etc (step S1 in FIG. 3).

Although it is arbitrary whether or not it is set to input the manager password, it is preferable that it be done in terms of security.

The above password needs to be input to the computer 10, when destination information, information regarding items to be acquired by the communication unit, trigger information or transmission interval information is changed. Authentication unit is provided to execute user authentication by using the set password and the password input by the user. Further, after setting the password, it can be set whether or not to allow the password to be changed (see FIG. 4).

Moreover, it can be set whether or not to enable the security tracking function (allow it to be applied). Suppose when the item ALLOW is checked, the security tracking function is enabled. In addition, owner information, etc. may be input.

Figure 5:
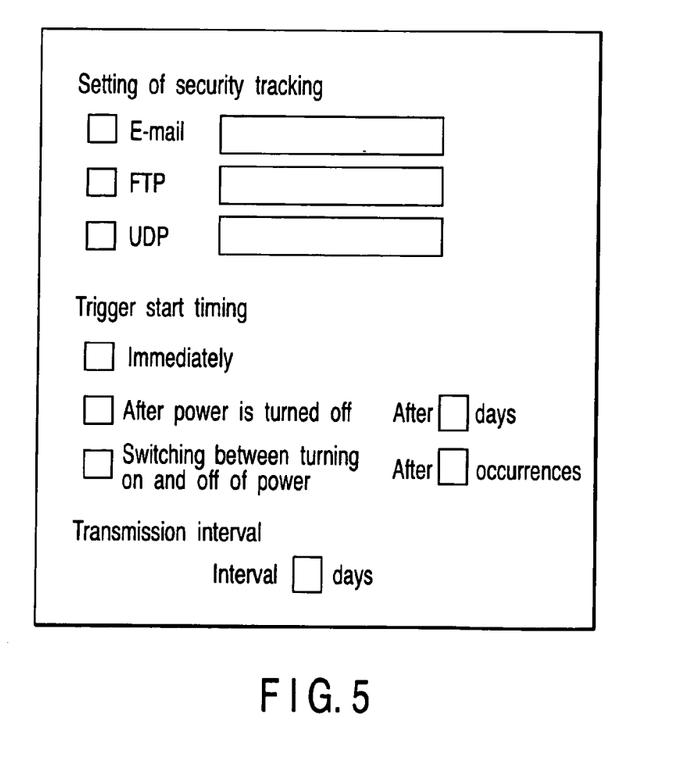
FIG. 5 is a diagrammatic view showing an image for detail setting of the security tracking function (setting of information regarding the computer).

In the case where it is set to enable the security tracking function ("ENABLE" in step S2 in FIG. 3) by referring to the window shown in FIG. 4, detail setting of the security tracking function is carried out (step S3 in FIG. 3). FIG. 5 is a diagrammatic view showing an example of a window which is displayed when the detail setting of the security tracking function is carried out.

For example, as the destination information to be transmitted with the LAN function, an E-mail address, a file transfer protocol (FTP) server address, or a user datagram protocol (UDP), etc. is input. Furthermore, as timing information indicating starting of transmission of information, the trigger information can be set to indicate that, for example, the information is to be immediately transmitted, or it is to be transmitted after a lapse of a set day or days after the computer is powered down, or it is to be transmitted when the number of times the computer is powered up and down reaches a predetermined number. In addition, the interval at which information is re-transmitted after initial transmission of the information can be arbitrarily set.

Subsequently, in order that the security tracking information be used, information on a license contract is displayed to require the user to agree to the license contract (step S4 in FIG. 3). Then, the user sets a network environment (step S5 in FIG. 3). For example, the user performs setting regarding an Internet Protocol (IP) address, subnet information and gateway information, etc.

Finally, the owner of the computer 10 is registered (step S6 in FIG. 3) to end the detail setting of the security tracking function.

It should be noted that the information input in the above setting is stored in a nonvolatile memory or the like included in the BIOS-ROM 119 or the EC/KBC 118. It is not preferable that the information input to the computer 1 could be easily accessed. Thus, preferably, the information input in the above setting should be stored in a predetermined region specified by the designer of the computer 10.

Figure 6:
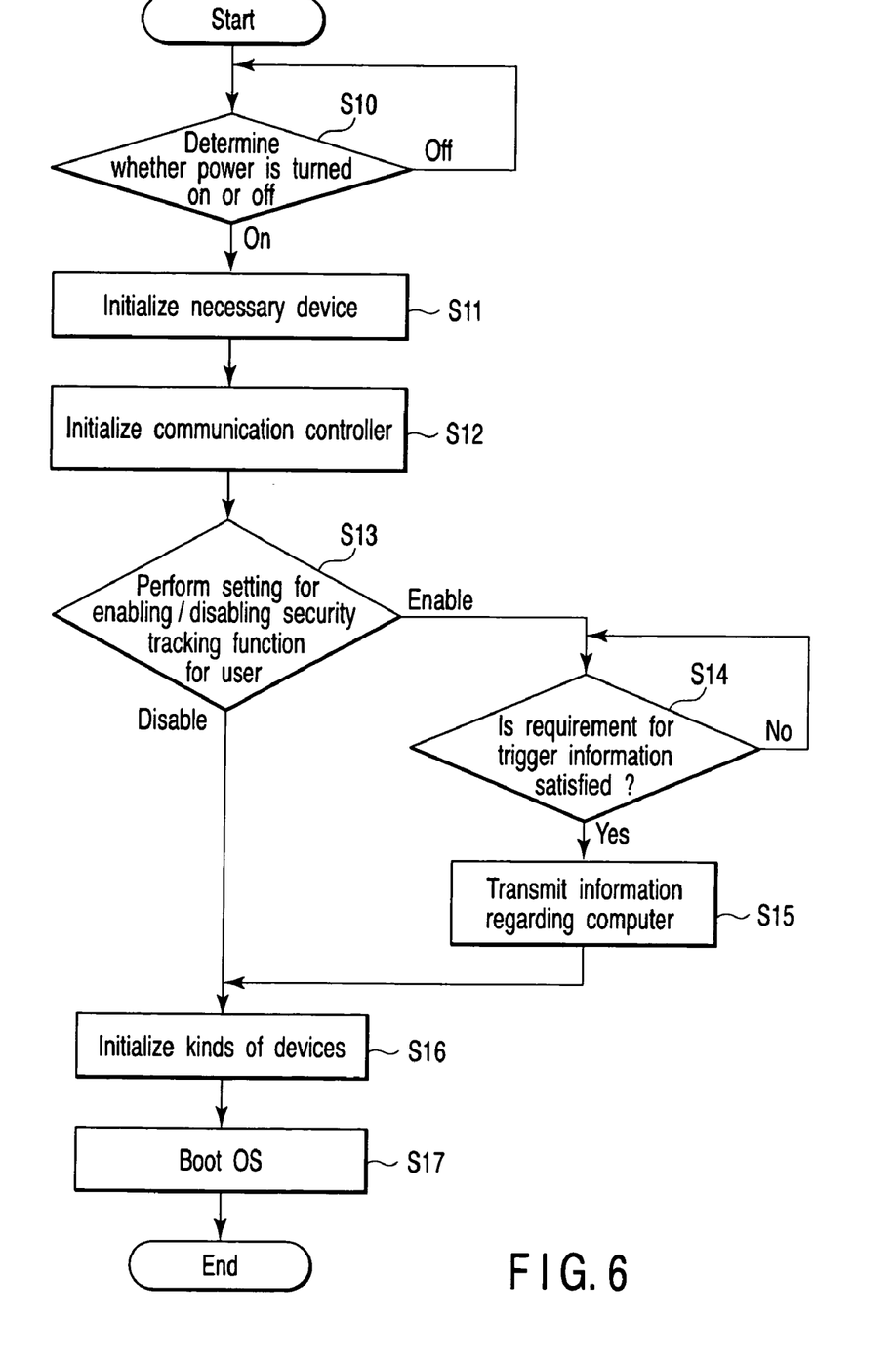
FIG. 6 is a flowchart of an operation of the security tracking function in the case where the computer is started after the security tracking function is set.

When the above setting of the security tracking function is completed, and the computer 10 is re-started, the security tracking function starts to operate in a manner as explained below:

Security tracking will be explained as follows:

FIG. 6 is a flowchart of security tracking which is to be carried out when the computer 10 is powered up after setting the above security tracking function (step S10).

First, it is determined whether power is supplied to the computer 10 or not (step S10). When it is determined that power is supplied to computer 10, a SystemBIOS initializes a necessary device (step S11). Then, the SystemBIOS initializes a communication controller (step S12). For example, the SystemBIOS initializes the LAN controller 115, thereby making the communication controller available.

The SystemBIOS determines whether the security tracking function is enabled or disabled in the above setting (step S13). When it determines in step S13 that the set security tracking function is enabled, it also determines whether the requirement for the trigger information is satisfied or not (step S14). For example, when it is set as the requirement for the trigger information that the information is to be immediately transmitted, the information regarding the computer 10 is transmitted to, e.g., a device indicated by an E-mail address, which is set based on the destination information (step S15).

It should be noted that as a communication program to be executed in step S15, an optimal one is used in accordance with a communication protocol. To be more specific, the procedure for transmitting a packet including the information regarding the computer 10 by using the USP is incorporated into, e.g., the BIOS. On the other hand, in communication (transmission of, e.g., as an E-mail or FTP) using a TCP, most of communication processings including network connection are performed by the communication controller such as the LAN controller 115 (this is because they can be more easily performed by the communication controller than the BIOS which is limited in size, since the number of programs for executing a mail transmission processing is large).

In addition, it can be considered that the processings are carried out by using the UDP only. In this case, although the reliability of the communication is lowered, a conventional communication controller can be used for the processings.

Furthermore, the CPU 108 can be used to carry out the step 15 instead of the communication controller such as the LAN controller 115, and the communication program can be stored in the LAN controller 115. After starting the computer 10, programs required for a communication routine are stored in the memory in the LAN controller 115, and in the step S15, the programs for the communication routine are loaded into the MEM 109, and then the programs are started from the BIOS-ROM 119. In this method, the CPU 108, as stated above, carries out the step S15, i.e., the element which carries out the step S15 is not changed from the CPU 108. Thus, the manufacturing cost is low with respect to the step S15.

Furthermore, after the above information is transmitted, it is re-transmitted at intervals indicated by transmission interval information, e.g., every other day, in the case where the transmission interval information is set (see FIG. 5).

It should be noted that the information regarding the computer 120 is the information regarding the items to be acquired by, e.g., the communication unit, that is, it corresponds to LAN connection information (IP address, subnet information and gateway information, etc.) regarding the LAN function, connection base station information regarding the radio LAN function, connection provider information and/or user ID information, position information regarding the GPS function, telephone number information regarding the communication card function and/or the telephone function, and log-on name information regarding the personal computer, etc. Furthermore, as the requirement for the trigger information, the following cases can be considered: for example, the case wherein the computer 10 starts to operate within a predetermined time period; the case wherein the computer 10 operates; and the number of times an error occurs in verification of the password reaches a predetermined number, and the case where an abnormality indicated by a predetermined abnormality detection item or items occurs. It should be noted that the predetermined abnormality detection item or items can be arbitrarily set. For example, it may be set that after a use pattern of the real user of the computer 10 is learned, when it is detected that the computer is used in a pattern different from the learned use pattern of the real user, it is determined that the requirement for the trigger information is satisfied.

Furthermore, flag information may be used in the following manner: flag information (set to, e.g., 0 prior to shipment of the computer), which is not initialized even when the BIOS in the BIOS-ROM 119 or the operating system (OS) is initialized, is stored in the nonvolatile memory included in the EC/KBC 118. In the case where the flag information is set to be changeable at a predetermined number of times, e.g., once, when it is changed to, e.g., 1, the destination information, the information regarding items to be acquired by the communication unit, the trigger information and the transmission interval information are not allowed to be changed, and only when the flag information is kept at 0, the above kinds of information can be changed. It should be noted that when the flag information is set to be changeable at the maker only, the security is further improved.

The above kinds of information can be distributively stored in the BIOS-ROM 119 and the EC/KBC 118. Also, the above setting can be performed in the BIOS or the operating system. Also, it can be set to be performed in the BIOS only.

Subsequently, as shown in FIG. 6, the SystemBIOS initializes kinds of devices in order to start the operating system (step S16), and then starts (boots) the operating system (step S17).

Consequently, after the computer 10 is powered up, for example, a BIOS program is executed before starting the operating system, and the information regarding the computer 10 is transmitted to an external device, as a result of which the real user of the computer 10 can grasp, e.g., the present position of the computer 10 which is indicated by present position information.

Therefore, for example, even if a person steals the computer 10, when he or she powers up the computer 10, the information regarding the computer 10 (e.g., the present position information regarding the computer 10) is transmitted to the real user side of the computer 10. Thus, the real user can certainly know the present situation with respect to the computer 10.

Furthermore, the program for performing the tracking function is stored in a storage region which cannot be easily accessed for data by the user, such as the BIOS-ROM 119 or the EC/KBC 118. As a result, even if a person steals the computer 10, he or she is prevented from enabling the tracking function.

Figure 7:
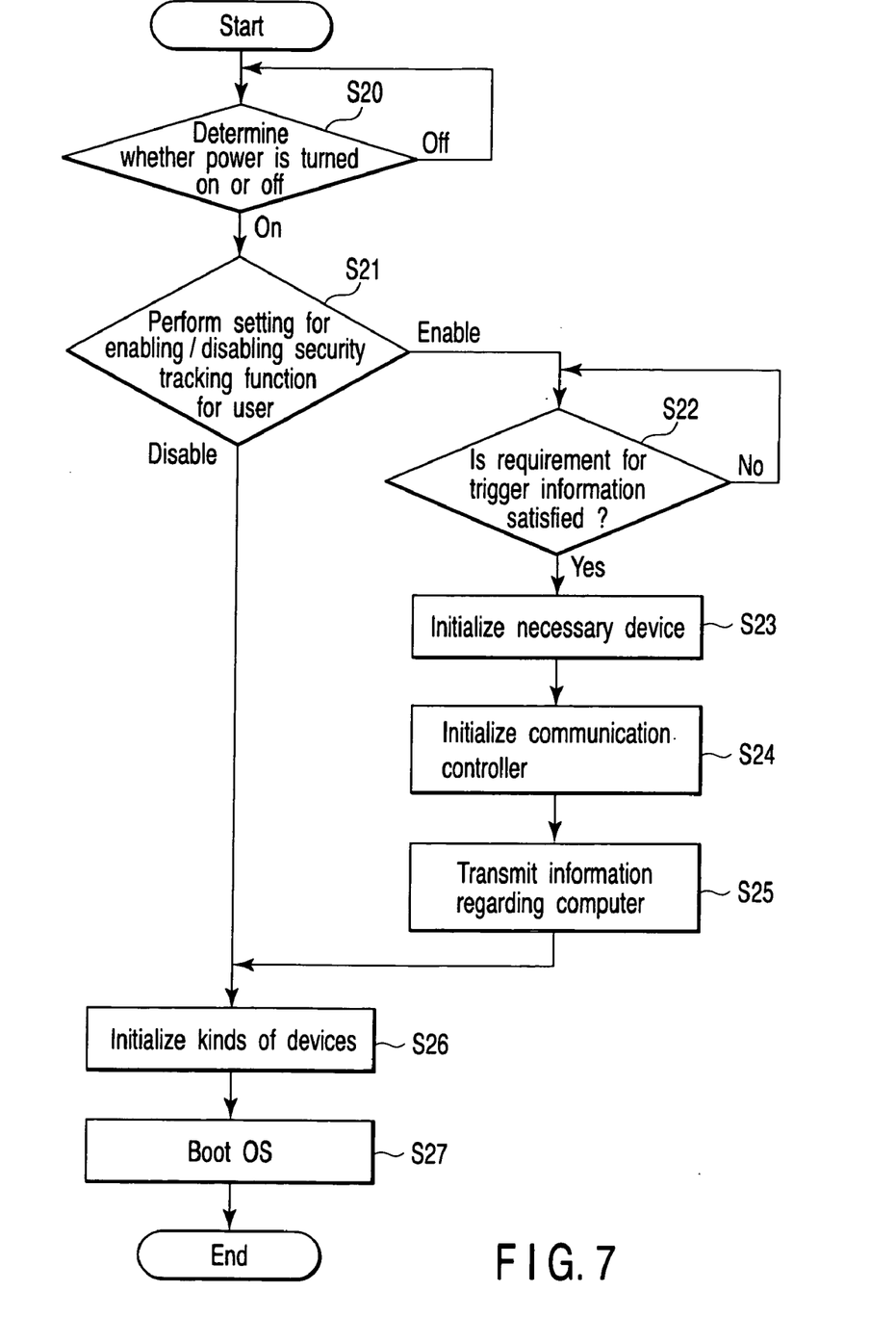
FIG. 7 is a flowchart of a modification of the operation of the security tracking function in the case where the computer is started after the security tracking function is set.

Moreover, according to a modification of the above embodiment, as shown in FIG. 7, after the computer 10 is powered up (step S20), it is determined whether the security tracking function is enabled or disabled (step S21). Thereafter, a step S22 corresponding to the step S14 in FIG. 6, a step S23 corresponding to the step S11 in FIG. 6, a step S24 corresponding to the step S12 in FIG. 6, a step S25 corresponding to the step S15 in FIG. 6, and steps S26 and S27 corresponding to the steps S16 and S17 in FIG. 6 are carried out.

In addition, only in the case where the security tracking function is enabled, and the requirement for the trigger information is satisfied, needless processing such as processing for initializing devices can be omitted.

Furthermore, according to another modification, the information regarding the computer 10 is transmitted when the computer 10 is disabled. As information which is kept stored even when the computer 10 is disabled, a Dynamic Host Configuration Protocol (DHCP), etc. is present. To be more specific, for example, even when the computer 10 is in the OFF state, the EC/KBC 118, which detects that the computer 10 is powered up/down, is available. Thus, for example, in the case where the EC/KBC 118 is formed to be capable of detect that a LAN cable is connected to the computer 10 when the computer 10 is the OFF state, the EC/KBC 118 executes processing to be performed when the security tracking function is enabled, after detecting connection of the LAN cable to the computer 10. As a result, the information regarding the computer 10 can be transmitted to the real user side. The information can be produced to include the DHCP.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus capable of communicating with an external device, and comprising:
   a display section; and
   a setting section to be displayed by the display section, and configured to enable or disable a function of transmitting information regarding the information processing apparatus to the external device by using the communication section, after the information processing apparatus is powered up; and
   a starting section configured to start an operating system after the information regarding the information processing apparatus is transmitted to the external device.

2. The information processing apparatus according to claim 1, wherein the setting section includes a second setting section configured to set information for use in transmitting the information regarding the information processing apparatus to the external device.

3. The information processing apparatus according to claim 2, wherein the setting section includes an authentication section which is used when the information set by the second setting section is re-set.

4. The information processing apparatus according to claim 1, which further comprises a determination section configured to determine whether the function is enabled or disabled, in accordance with starting of the information processing apparatus, after the setting section enables or disables the function.

* * * * *